(12) United States Patent
Klaus-Nietrost et al.

(10) Patent No.: US 11,519,100 B2
(45) Date of Patent: Dec. 6, 2022

(54) REUSING OF LYOCELL-CELLULOSE FOR LYOCELL-METHODS

(71) Applicant: LENZING AKTIENGESELLSCHAFT, Lenzing (AT)

(72) Inventors: Christoph Klaus-Nietrost, Vöcklabruck (AT); Richard Herchl, Ried im Innkreis (AT); Christian Weilach, Vöcklabruck (AT); Christian Sperger, Schörfling (AT)

(73) Assignee: LENZING AKTIENGESELLSCHAFT, Lenzing (AT)

( * ) Notice: Subject to any disclaimer, the term of this patent is extended or adjusted under 35 U.S.C. 154(b) by 135 days.

(21) Appl. No.: 16/962,207

(22) PCT Filed: Jan. 14, 2019

(86) PCT No.: PCT/EP2019/050753
§ 371 (c)(1),
(2) Date: Jul. 14, 2020

(87) PCT Pub. No.: WO2019/138097
PCT Pub. Date: Jul. 18, 2019

(65) Prior Publication Data
US 2021/0062369 A1 Mar. 4, 2021

(30) Foreign Application Priority Data
Jan. 15, 2018 (EP) .................................... 18151708

(51) Int. Cl.
*D01F 2/00* (2006.01)
*D01F 2/06* (2006.01)
(Continued)

(52) U.S. Cl.
CPC ................ *D01F 2/06* (2013.01); *B29B 17/04* (2013.01); *B29C 48/022* (2019.02); *B29C 48/05* (2019.02);
(Continued)

(58) Field of Classification Search
CPC ................ B29B 17/04; B29K 2001/08; B29K 2105/26; D01D 1/02; D01D 5/06; D01F 2/00; D01F 2/02; D10B 2201/22
(Continued)

(56) References Cited

U.S. PATENT DOCUMENTS 3,801,273 A 4/1974 Mays
3,937,671 A 2/1976 Gruntfest et al.
(Continued)

FOREIGN PATENT DOCUMENTS

CN 1383965 A 12/2002
CN 1430684 A 7/2003
(Continued)

OTHER PUBLICATIONS

International Search Report of corresponding PCT/EP2019/050753, dated Mar. 15, 2019, 5 pages.
(Continued)

*Primary Examiner* — Leo B Tentoni
(74) *Attorney, Agent, or Firm* — Lewis Roca Rothgerber Christie LLP

(57) ABSTRACT

Method of manufacturing a cellulose-regenerated-molded body, wherein the method comprises supplying a starting material which is manufactured by a lyocell-method and which comprises cellulose, which is manufactured by solving a cellulose source in a solvent for manufacturing a spinning mass, by extruding the spinning mass and by subsequently precipitating in a spinning bath, solving the starting material which comprises cellulose, in a solvent for
(Continued)

manufacturing a spinning mass, and extruding, and subsequently precipitating the spinning mass in a spinning bath, wherein thereby the molded body is obtained.

15 Claims, 3 Drawing Sheets

(51) Int. Cl.
| | |
|---|---|
| *B29C 48/00* | (2019.01) |
| *B29C 48/88* | (2019.01) |
| *B29C 48/05* | (2019.01) |
| *C08J 11/08* | (2006.01) |
| *D01D 1/02* | (2006.01) |
| *D01D 5/06* | (2006.01) |
| *D01F 13/02* | (2006.01) |
| *B29B 17/04* | (2006.01) |
| *D01F 2/02* | (2006.01) |
| *B29K 1/00* | (2006.01) |
| *B29K 105/26* | (2006.01) |

(52) U.S. Cl.
CPC ............ *B29C 48/919* (2019.02); *C08J 11/08* (2013.01); *D01D 1/02* (2013.01); *D01D 5/06* (2013.01); *D01F 2/02* (2013.01); *D01F 13/02* (2013.01); *B29K 2001/08* (2013.01); *B29K 2105/26* (2013.01); *C08J 2301/02* (2013.01); *D10B 2201/22* (2013.01); *D10B 2201/24* (2013.01)

(58) Field of Classification Search
USPC .......................... 264/140, 187, 203, 914, 920
See application file for complete search history.

(56) References Cited

U.S. PATENT DOCUMENTS

| | | | |
|---|---|---|---|
| 4,246,221 A | 1/1981 | McCorsley | |
| 4,345,039 A | 8/1982 | Cowan et al. | |
| 5,240,530 A | 8/1993 | Fink | |
| 5,598,980 A | 2/1997 | Dilly-Louis et al. | |
| 5,601,767 A | 2/1997 | Firgo et al. | |
| 5,722,603 A | 3/1998 | Costello et al. | |
| 6,258,304 B1 | 7/2001 | Bahia | |
| 2003/0155673 A1* | 8/2003 | Zikeli | D01F 2/00 264/187 X |
| 2006/0099419 A1 | 5/2006 | Kwon et al. | |
| 2010/0248572 A1 | 9/2010 | Firgo et al. | |
| 2015/0329771 A1 | 11/2015 | Danielec et al. | |
| 2017/0016148 A1 | 1/2017 | Niemz et al. | |
| 2020/0165747 A1* | 5/2020 | Lindgren | D01F 2/00 |

FOREIGN PATENT DOCUMENTS

| | | |
|---|---|---|
| CN | 1772983 A | 5/2006 |
| CN | 101802277 A | 8/2010 |
| CN | 106103820 A | 11/2016 |
| DE | 44 09 335 A1 | 9/1994 |
| DE | 198 82 319 T1 | 7/2000 |
| DE | 696 18 988 T2 | 9/2002 |
| EP | 0 205 346 B1 | 12/1986 |
| EP | 0 636 646 A1 | 2/1995 |
| EP | 0 681 896 A1 | 11/1995 |
| EP | 3 339 504 A1 | 6/2018 |
| EP | 3 511 140 A1 | 7/2019 |
| WO | WO 96/07778 A1 | 3/1996 |
| WO | WO 97/021490 A2 | 6/1997 |
| WO | 0181663 A1 | 11/2001 |
| WO | WO 02/40766 A2 | 5/2002 |
| WO | WO 2013/182801 A1 | 12/2013 |
| WO | WO 2014/045062 A1 | 3/2014 |
| WO | WO 2014/086579 A1 | 6/2014 |
| WO | WO 2016/123643 A1 | 8/2016 |
| WO | WO 2017/019802 A1 | 2/2017 |

OTHER PUBLICATIONS

Witten Opinion of corresponding PCT/EP2019/050753, dated Mar. 15, 2019, 7 pages.
Search Report of corresponding EP 18151708.7, dated Jun. 29, 2018, 7 pages.
Office Action of corresponding TW application 108101353, dated Apr. 10, 2020, 27 pages with English translation.
Ouchi, et al., "A new methodology to recycle polyester from fabric blends with cellulose," Cellulose 17.1 (2010), pp. 215-222.
Golova, et al., "Structure—Properties Interrelationships in Multicomponent Solutions Based on Cellulose and Fibers Spun Therefrom," Cellulose—Fundamental Aspects, chapter 13, 2013, pp. 303-342.
Scholz, "Thermoplastisches Polyurethan," Index | FAPU 15, Nov./Dec. 2002 | Fachartikel, 4 pages.
Tausif, et al., "Mechanical Properties of Nonwoven Reinforced Thermoplastic Polyurethane Composites," Material 2017, 10, 618, 13 pages.
"Einzigartig wie ein Fingerabdruck", Markt & Technik 38/2013, 2 pages.
Indian First Examination Report for Application No. 202017030214, dated May 11, 2022, 5 pages.
Chinese Office action for Application No. 201980008648.4, dated Aug. 3, 2022, 15 pages.

* cited by examiner

REUSING OF LYOCELL-CELLULOSE FOR LYOCELL-METHODS

CROSS-REFERENCE TO RELATED APPLICATIONS

This application is a National Phase Patent Application and claims priority to and the benefit of International Patent Application No. PCT/EP2019/050753, filed Jan. 14, 2019, which claims priority to and the benefit of European Patent Application No. EP 18151708.7, filed Jan. 15, 2018, the entire contents of all of which are incorporated herein by reference.

FIELD OF INVENTION

The invention relates to a method of manufacturing a molded body which comprises cellulose and to a use.

BACKGROUND

As viscose fibers, chemical fibers and regenerated fibers are denoted, which are manufactured by means of a wet spinning method which is called viscose-method. The starting raw material of the viscose-method is cellulose which is provided on the basis of wood. From this starting raw material wood, the highly pure cellulose in form of chemical pulp is obtained. In subsequent process stages, the pulp is first treated with caustic soda, whereby alkali cellulose is formed. In a subsequent conversion of said alkali cellulose with carbon disulfide, cellulose-xanthogenate is formed. From this, by further supplying caustic soda, the viscose-spinning solution is generated which is pumped through holes of shower-like spinning nozzles into a spinning bath. There, one viscose-filament per spinning nozzle hole is generated by coagulation. The such manufactured viscose-filaments are subsequently cut to viscose-staple fibers.

Lyocell denotes a regenerated fiber type comprising cellulose, which is manufactured according to a direct solvent method. The cellulose for the lyocell-method is extracted from the raw material wood. The such obtained pulp may subsequently be solved in N-methylmorpholine-N-oxide (NMMO), a solvent, by dehydration without chemical modification, filtered, and subsequently pressed through spinning nozzles. The such formed filaments, after passing an air gap, are precipitated in a bath with an aqueous NMMO-solution and are subsequently cut to staple fibers.

Both for the lyocell-method and for the viscose-method, conventionally, typically the raw material wood is utilized.

SUMMARY

It is an object of the present invention to manufacture cellulose products in a resource-saving and sustainable manner.

This object is solved by the subject matters according to the independent patent claims. Preferred embodiments result from the dependent patent claims.

According to an embodiment of the present invention, a method of manufacturing a molded body which comprises cellulose is provided, wherein in the method, a starting material which is manufactured by a lyocell-method and which comprises cellulose, is supplied which is manufactured by (in particular directly) solving (in particular by dehydration without chemical modification) a cellulose source in a solvent and by subsequently precipitating the cellulose by diluting the solved cellulose source, the starting material which comprises cellulose (in particular present in a solid body phase, for example present as solid body or in form of solid body particles) is (in particular directly) solved in a solvent (in particular by dehydration without chemical modification), and subsequently at least a part of the cellulose is precipitated by diluting the solved starting material, wherein thereby the molded body (for example a fleece or nonwoven) is obtained.

According to another embodiment of the present invention, a method of manufacturing a cellulose-regenerated-molded body is provided, wherein the method comprises supplying a starting material which is manufactured by a lyocell-method and which comprises cellulose, which is manufactured by solving a cellulose source in a solvent for manufacturing a spinning mass, by extruding the spinning mass and by subsequently precipitating in a spinning bath, solving the starting material which comprises cellulose in a further solvent for manufacturing a further spinning mass, and extruding and subsequently precipitating the further spinning mass in a further spinning bath, wherein thereby the molded body is obtained.

According to another embodiment, a starting material which is manufactured by a first lyocell-method and which comprises cellulose, is used for manufacturing a molded body which comprises cellulose, by treating the starting material by a second lyocell-method.

In the context of this application, the term "cellulose" may in particular denote an organic compound which is a constituent of plant cell walls or can be manufactured synthetically. Cellulose is a polysaccharide (i.e. a multiple sugar). Cellulose is unbranched and typically comprises multiple hundred up to ten thousands β-D-glucose molecules (β-1, 4-glycosidic linkage) and cellobiose-units, respectively. From cellulose molecules, cellulose fibers are built by plants in a controlled manner. By means of a technical process, cellulose molecules can be agglomerated under formation of regenerated fibers, for example as tearproof fibers.

In the context of this application, the term "molded body" may in particular denote a two-dimensional or three-dimensional geometric body which is a result of a method of manufacturing and recovery, respectively, of cellulose. In particular, a molded body denotes a two-dimensional or three-dimensional object which comprises cellulose or consists of it and is manufactured from solved pulp. Molded bodies may be in particular lyocell-molded bodies, viscose-molded bodies or modal-molded bodies. Typical molded bodies are filaments, fibers, sponges and/or films. Basically, all types of cellulose molded bodies are suitable for embodiments of the invention. Both endless filaments and cut staple fibers with conventional dimensions (for example 38 mm length) and short fibers are considered as fibers. For manufacturing fibers, both methods with withdrawing devices downstream of one or more extrusion nozzles, and also other methods, as in particular melt-blowing-methods, are possible. Alternatively to fibers, a foil which comprises cellulose can be manufactured as molded body, i.e. a planar and substantially homogenous film with or made of cellulose. Foils may be in particular manufactured by adjusting the process parameters of a lyocell-method such that coagulating is at least partially triggered only after the filaments impinge on a receiving surface. Planar cellulose molded bodies are considered as foils, wherein the thickness of these foils is adjustable (for example by selecting a number of serially arranged nozzle beams). Other embodiments of a molded body are a tissue and a fleece made of cellulose filaments and cellulose fibers, respectively, in particular a spinning fleece made of integrally merged ("merging")

substantially continuous cellulose filaments ("melt blown"). Here, in particular a textile planar structure made of at least two (preferably orthogonal or almost orthogonal) crossed thread systems (or fiber systems) may be considered as a tissue, wherein threads (or fibers) in longitudinal direction may be denoted as warp threads and threads (or fibers) in a transverse direction may be denoted as weft threads. A fleece or nonwoven may be denoted as disordered (in particular present in random orientation) structure of filaments or fibers or cut yarn with limited length which are joined together to a fiber layer or a fiber web and which are connected to each other (in particular in a frictionally engaged manner). A molded body may also be generated in the form of a sphere. As molded body, also cellulose-comprising particles, as in particular beads (i.e. a granulate and spherules, respectively) or flakes may be provided which can be further processed in this form. Thus, possible cellulose molded bodies are also particulate structures as granulate, spherical powders or fibrids. A shaping of a molded body is preferably performed by extrusion of a spinning solution which contains cellulose through an extrusion nozzle, since large amounts of cellulose molded bodies with a very uniform shape can be manufactured in this way. A further possible cellulose molded body is a sponge or, more general, a porous molded body. According to exemplary embodiments, the mentioned molded bodies can be used for manufacturing yarns, textiles, gels or composite materials, for example.

In the context of this application, the term "cellulose source" may in particular denote a medium (in particular a solid body medium) which, as basis for manufacturing a molded body which comprises cellulose, during a corresponding manufacturing method, provides the cellulose material used for this purpose. An example is wood and wood pulp, respectively.

In the context of this application, the term "lyocell-method" may in particular denote a method of manufacturing cellulose according to a direct solvent method. The cellulose for the lyocell-method can be obtained from a starting material which contains said cellulose. In the lyocell-method, the starting material can be solved in a suitable solvent (in particular comprising tertiary amine oxides, such as N-methylmorpholine-N-oxide (NMMO) and/or ionic liquids, i.e. low-melting salts made of cations and anions).

Solving may be performed in particular by dehydration and/or without chemical modification. The obtained solution, which may be also denoted as dope or spinning solution, may subsequently be pressed through one or more spinning nozzles in the lyocell-method. Thereby formed filaments can be precipitated during and/or after their free or controlled fall through an air gap in a water containing bath (in particular in a bath with aqueous NMMO-solution) and/or in the air humidity present in the air gap.

In the context of this application, the term "viscose-method" may in particular denote a method of manufacturing cellulose according to a wet spinning method. The cellulose for the viscose-method can be obtained from a starting material (in particular wood or a wood pulp) which contains said cellulose. In subsequent process stages in the viscose-method, the starting material can first be treated with a base (for example caustic soda), whereby alkali cellulose is formed. In a subsequent conversion of said alkali cellulose with carbon disulfide, cellulose-xanthagonate is formed. From this, by a further supply of a base (in particular caustic soda), a viscose-spinning solution can be produced which can be pressed through one or more spinning nozzles. In a spinning bath, viscose-filaments are generated by coagulation.

In the context of this application, the term "remains from a clothing manufacture" may in particular denote waste and/or offcut of a textile or yarn which comprises or consists of cellulose, wherein said remains occur during a method of manufacturing clothes. In the manufacture of clothing, for example a textile which comprises cellulose is manufactured as starting material, from which planar parts (for example in form of a half T-shirt) are cut. Remains are left, which can be resupplied to a method of manufacturing a molded body which comprises cellulose, according to an exemplary embodiment. Thus, remains from a clothing manufacture may be a starting material which comprises or consists of cellulose, which can be used for recovering cellulose before a consumer has used the remains as clothes or in any other way. In particular, the remains from a clothing manufacture may be made of substantially pure cellulose, in particular without foreign matters which are separate and do not comprise cellulose (as buttons, textile print or seams, for example).

In the context of this application, the term "old clothes" may denote clothes, in particular comprising cellulose, which have been already used (in particular worn) by a user when at least a part of the cellulose is recovered. Thus, old clothes may be a starting material comprising cellulose which may (but does not have to) comprise a substantial amount of foreign matters and which may be used for recovering cellulose, after a user has used the old clothes as clothing or in any other way. In particular, old clothes may be made of a mixture of cellulose and one or more foreign matters, in particular comprising (in particular frequently used in clothing) synthetic plastic (as polyester and/or elastane, for example) and/or foreign matters which are separate and do not comprise cellulose (such as buttons, textile print or seams). Polyester may in particular denote polymers with ester functions (R—[—CO—O—]—R) in their main chain. Polycarbonates and polyethylene terephthalate belong to polyesters. Elastane in particular denotes an extensible chemical fiber with a high elasticity. A block copolymer which is underlying elastane may contain 85% by weight polyurethane.

According to an exemplary embodiment of the invention, cellulose-molded bodies may be at least partially manufactured on basis of a starting material which is manufactured by a lyocell-method (for example lyocell-textile remains and/or lyocell-old textiles), which may be performed by a faster and simpler manufacturing method and in a resource-saving and sustainable manner. These advantages are in particular based on the fact that lyocell-cellulose may be supplied to and made subject to a further lyocell-method in an especially unproblematic manner. Since the lyocell-method is a direct-solving method, wherein the cellulose may be directly supplied to a dope and is solved there without further ado, an elaborate chemical pretreatment of the starting material may be dispensable. In the described manner, a starting material which comprises lyocell-cellulose can be introduced in a new lyocell-method with advantage, for a recovery and a recycling, respectively, of this cellulose. Since the cellulose is surprisingly not exposed to a significant degradation during the lyocell-method, also a multiple iterative resupplying of lyocell-cellulose in a renewed lyocell-method is possible without a noteworthy deterioration of the quality of the cellulose of the manufactured molded bodies. It has turned out that, in multiple subsequent lyocell-methods under respective reusing of lyocell-cellulose which is obtained in a respectively preceding iteration, the limiting viscosity number is reduced only very slightly. This advantageously extremely low degradation of the lyocell-cellulose which is nearly not noteworthy, in a sequence of subsequent lyocell-methods, is significantly more advantageous than in multiple subsequent viscose-methods under respective reusing of previously obtained viscose. There, a significantly faster and stronger reduction of the limiting viscosity number is noticeable than in a sequence of multiple lyocell-methods. Therefore, a lyocell-from-lyocell architecture according to an exemplary embodiment is significantly more advantageous than a viscose-from-viscose architecture.

In the following, additional embodiments of the method and the use are described.

According to an embodiment, the diluting of the solved cellulose source may be caused by an aqueous milieu, in particular comprising regulatable air humidity and/or a water bath, further in particular substantially consisting of water or a mixture of water and solvent (in particular NMMO). In a corresponding manner, the diluting of the solved starting material may be caused by an aqueous milieu, in particular comprising regulatable air humidity and/or a water bath, further in particular substantially consisting of water or a mixture of water and solvent (in particular NMMO). Descriptively, in the first lyocell-method and in the second lyocell-method, respectively, by means of the water (in particular regulatable air humidity in combination with a liquid bath with water and optionally a solvent which is arranged below), the concentration of the solvent which caused the cellulose to solve, is reduced to such an extent that the obtained diluted solution sinks below the solubility limit of cellulose and the cellulose is therefore precipitated and deposited, respectively. The coagulation medium (i.e. in particular the air humidity and the water bath, respectively) may be substantially pure water or may be combined with a solvent.

According to an embodiment, in the method, the molded body, after finishing the manufacture of it and preferably after using this molded body or a product manufactured therefrom, may be re-solved in a solvent for an intended purpose (for example as item of clothing) and subsequently at least a part of the cellulose may be precipitated by diluting the solved molded body, wherein thereby—by performing a third lyocell-method—another molded body is obtained. In other words, after the second lyocell-method, at least one further lyocell-method may be performed based on the product obtained from the second lyocell-method as starting material for this third lyocell-method. Thus, at least three, in particular at least four, or still more lyocell-methods may be performed in series, in order to repeatedly recover the cellulose. This is possible due to the only slightly degradation of the cellulose during the performance of a lyocell-method, wherein this degradation is for example significantly lower than in multiple serially performed viscose-methods. Thereby, also for industrial applications, a multi-stage recovery of lyocell-cellulose can be enabled which leads to an especially efficient and environmentally friendly handling with resources. For example, textiles (i.e. line-shaped, plane-shaped or spatial structures which are in particular manufactured on basis of cellulose) which comprise lyocell-cellulose in pure form or as mixed tissue, may be made subject to a recycling under performance of a renewed lyocell-method more than two times. For example, in a lyocell-method, starting from an initial limiting viscosity number (which correlates with the degree of polymerization of the cellulose) of 400 ml/g, an only slight reduction to approximately 390 ml/g may be performed. In comparison to that, in a viscose-method, in subsequent iterations, a reduction of the mentioned parameter of for example initially 550 ml/g to 240 ml/g, and in a next cycle to 220 ml/g may be performed. This predestinates the lyocell-method in a special manner for a resource-saving and sustainable multiple subsequent recovery of cellulose material produced by it.

According to an embodiment, the method may comprise comminuting, in particular mechanically comminuting, further in particular shredding, the starting material prior to solving the starting material in the solvent. For example, by comminuting, a reduction of the size of the starting material to a fiber size may be performed. In particular, a such prepared starting material can be directly transferred in solution, also without chemical pretreatment, in order to generate a spinning mass with a high viscosity.

According to an embodiment, the method may comprise solving the starting material in the solvent without chemical pretreatment, in particular without chemically cleaning and/or without adjusting the viscosity. In this way, an especially efficient recovery of lyocell-cellulose by means of a further lyocell-method is possible.

According to another embodiment, the method may comprise at least partially cleaning, in particular chemically cleaning, the starting material prior to solving the starting material in the solvent. If the cellulose shall be recycled especially purely, the starting material may be cleaned by a previous optional cleaning step.

For example, according to an exemplary embodiment, the cleaning may comprise at least partially removing colorants (in particular by bleaching the starting material) from the starting material, prior to solving the starting material in the solvent. In this way, for example a pure white or at least bright cellulose material can be recovered from the starting material, for example when intensively colored denim-jeans textile shall be recycled. Alternatively, it is also possible to directly solve, after mechanically comminuting, if required, lyocell-containing textiles to be recycled without previous discoloring.

According to an embodiment, the starting material, prior to precipitating it (preferably already before solving it), may be at least partially freed from cross-linkers which are cross-linking the fibers of the starting material. For example, this may be performed by an alkaline and/or an acid pretreatment, in particular dependent from the type of the present cross-linker. A lyocell fiber is a fibrillating fiber which can be cross-linked with molecules. A corresponding cross-linker may disturb, since it may reduce the solubility of lyocell-cellulose in the lyocell-solvent. At least partially removing the cross-linker by a pretreatment (for example by performing an alkaline step and/or an acid step) under partially or completely solving the undesired cross-linking, the purity of the obtained cellulose can be increased.

According to an embodiment, the starting material may completely or partially comprise remains from a clothing manufacture and/or old clothes (for example mixed textiles). In other words, as at least a part of the starting material, textiles, in particular remains from a clothing manufacture and/or old clothes, may be used. Especially preferred is using remains from the clothing manufacture, since such an offcut and waste, respectively, frequently comprises a very high cellulose portion and thus a very high degree of purity. In particular, such a pre-consumer-textile may be free from foreign matters, such as buttons, seams or textile print. For example, the remains from the clothing manufacture may comprise substantially woven (and optionally colored) cellulose, so that such remains may also be directly transferred in solution, if required, in order to recover cellulose therefrom by the lyocell-method. In the case of old clothes or post-consumer-textiles, large foreign matters, such as buttons, prints, and seams, may be already separated during or after mechanically comminuting. Other foreign matters of the remains or old clothes, such as colors and synthetic plastics (such as polyester and elastane) may be completely or partially removed prior to solving a corresponding starting material for forming the dope and the spinning solution, respectively, but may nevertheless also completely or partially remain in the spinning solution.

According to an embodiment, the starting material, prior to precipitating it (in particular prior to solving it in the solvent), may be mixed with at least one other starting material which comprises cellulose. For example, the other starting material may comprise at least one material of a group which is consisting of wood pulp, rags pulp (in particular pulp from textile remains such as linen, rags, etc.), textiles, clothes, cotton (i.e. cellulose from a cotton plant) and cellulose manufactured by a viscose-method. Thus, it is also possible to provide only a part of the starting material for the subsequent lyocell-method in form of lyocell-cellulose from a previous lyocell-method. The starting material may also be an inhomogeneous mixed tissue. The rest of the starting material which is not supplied in form of lyocell-cellulose, can be restocked flexibly and according to availability by one or more other cellulose sources. Thereby, the industrial utilization of the lyocell-from-lyocell-method is not impaired by possible temporal bottlenecks of lyocell-cellulose. Instead, it is possible to compensate and balance out, respectively, possible missing quantities of lyocell-cellulose by other cellulose sources. Preferred, since especially uncomplicated in terms of process-technology, may be forming the starting material exclusively from lyocell-cellulose.

According to an embodiment, solving the starting material and/or solving the cellulose source may be performed by a direct solving method. Descriptively, in such a direct solving method, the cellulose is physically solved in the respective solvent. Preferably, tertiary amine oxides are utilized as solvent, especially preferred N-methylmorpholine-N-oxide (NMMO).

According to an embodiment, the method may comprise postprocessing the precipitated cellulose for adjusting the properties of the molded body. Such an optional postprocessing may comprise drying, impregnating and/or reshaping the obtained cellulose-filaments, for example. By a corresponding post-processing, it is possible to finish the molded body manufacture at the end of the lyocell-method in an application-specific manner.

According to an embodiment, fibers of the starting material and/or fibers of the molded body may comprise a smooth round outer surface. As illustrated in FIG. 3, cellulose fibers extracted by means of the lyocell-method are characterized by such a shape and therefore differ from other fiber shapes, as they occur in natural cotton or are obtained by a viscose-method.

The molded bodies manufactured according to the invention may be used as packaging material, fiber material, textile composite materials, fiber composite materials, fiber fleeces, needle felts, quilting cotton, tissues, knitted fabrics, home textiles such as bedclothes, as clothes, as filling textile, flocking substance, hospital textiles such as underlays, diaper or mattresses, as fabric for heating blankets, shoe inserts and wound dressings. Embodiments of the invention may be applicable in both different technical fields and in medicine and in cosmetics and wellness. In medicine, for example materials for wound treatment and wound healing may be made of a carrier which determines the mechanical properties and a biocompatible coating material which is especially compatible with the skin and with the surface of the wound. Many other applications are possible.

BRIEF DESCRIPTION OF THE DRAWINGS

In the following, exemplary embodiments of the present invention are described in detail with reference to the following figures.

DETAILED DESCRIPTION

Figure 1:
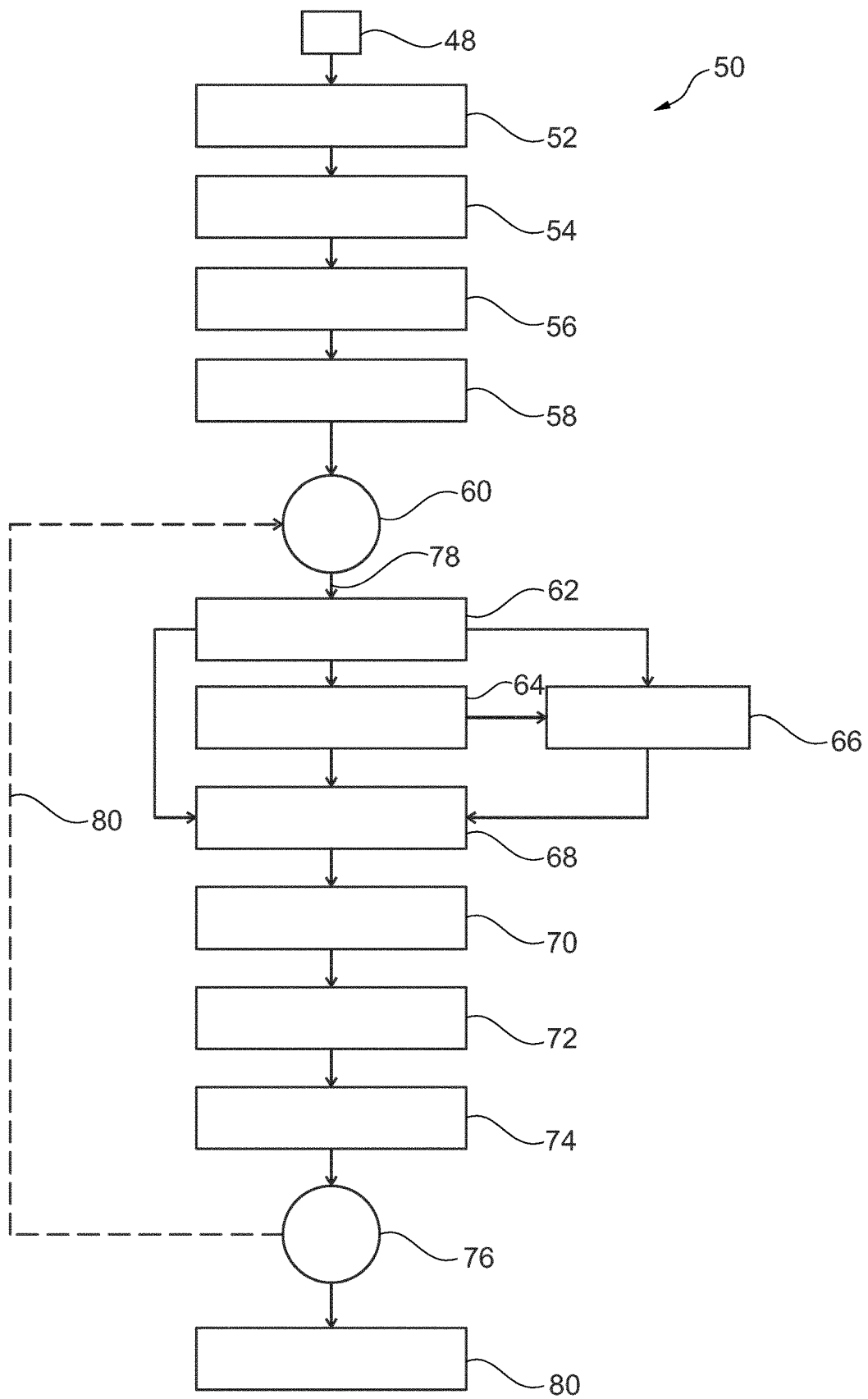
FIG. 1 shows a flow diagram of a method of manufacturing a molded body which comprises cellulose, according to an exemplary embodiment of the invention.

Same or similar components in different figures are provided with the same reference numbers.

Before, referring to the figures, exemplary embodiments are described, some basic considerations shall be summarized based on which exemplary embodiments of the invention have been derived.

According to an exemplary embodiment of the invention, lyocell-recycling-materials are used for manufacturing lyocell-fibers. The substantial difference to other cellulose-containing starting materials is that lyocell may be directly (i.e. without chemical pretreatment, preferably after comminuting) resupplied to the dope. The cellulose is then solved in a suitable solvent (in particular NMMO) again. This is only possible, since the lyocell-method is a direct solving method and no significant degradation of the cellulose (DP-degradation, wherein DP stands for the average degree of polymerization, i.e. the number of monomer units per macromolecule) occurs.

Thus, when a pulp is conditioned in the context of a lyocell-method (in particular in the sense of: the viscosity was correspondingly adjusted), such that it is suitable for the lyocell-method, the final product resulting from the method (lyocell-fibers and textiles manufactured therefrom or other application products) can be reused in a closed cycle, almost as often as desired (wherein the average degree of polymerization is slightly reduced over time). Thus, the lyocell-recycling-materials may replace conventional pulp.

Preferably, measures can be taken in the method, for keeping contaminations in the starting material low, or to separate them previously (for avoiding a blocking of a filter of a lyocell-device), to keep foreign matters in mixtures low or to separate them previously (for obtaining a high degree of purity of the recycled lyocell-cellulose), and/or to keep large particles low or to separate them previously. Preferably, as starting material according to an exemplary embodiment, wastes from the lyocell-fiber production and pre-consumer-waste are used, in particular with a high purity.

With advantage, according to an exemplary embodiment of the invention, a processing (for example cleaning, adjusting the viscosity) after supplying the starting material may be dispensable. Descriptively, by a method according to an exemplary embodiment, lyocell-cellulose may be directly processed to lyocell-cellulose again. In other words, materials which are manufactured by a lyocell-method may be used as raw material for a subsequent further lyocell-process.

According to a preferred embodiment of the invention, in the pulp recovery, recyclates (in particular recycled plastics from post-consumer-wastes) with a substantial portion of lyocell-fibers may be used. By using such a pulp for the lyocell process, recyclate products are possible which differ in their technical properties only slightly and even only minimal or not at all, respectively, from a lyocell-fiber which was manufactured without recyclate. In this embodiment, in particular the white values and strengths are highly correlated with the lyocell-fiber without recyclate.

For example, at least 3 weight percent, in particular at least 10 weight percent, further in particular at least 50 weight percent, lyocell-fibers with respect to the total weight of the starting material may be provided.

FIG. 1 shows a flow diagram 50 of a method of manufacturing a molded body 102 which comprises cellulose (compare FIG. 2) according to an exemplary embodiment of the invention.

At first, referring to FIG. 1, it is described, how a starting material 110 (compare FIG. 2) is manufactured which is recycled after a use as product (block 60), by a lyocell-method.

For manufacturing such a starting material 110 which comprises cellulose, at first a cellulose source 48 is used, i.e. a medium which comprises cellulose. It may be wood pulp, for example. By solving 52 the cellulose source 48 in a suitable solvent (compare for example reference sign 116 in FIG. 2, for example tertiary amine oxides, such as N-methylmorpholine-N-oxide (NMMO); however, also another solvent may be used for the cellulose source 48, for example ionic liquids), a lyocell-spinning solution and spinning mass, respectively, may be generated, i.e. the cellulose may be transferred in solution.

The such manufactured lyocell-spinning solution and spinning mass, respectively, may then be guided through one or more filters (in which foreign matters may be retained, for example) and may then be pressed through one or more spinning nozzles of a lyocell-device, whereby, by extruding, filaments which comprise cellulose with a consistency with a honey-like viscosity are obtained (see block 54).

Figure 2:
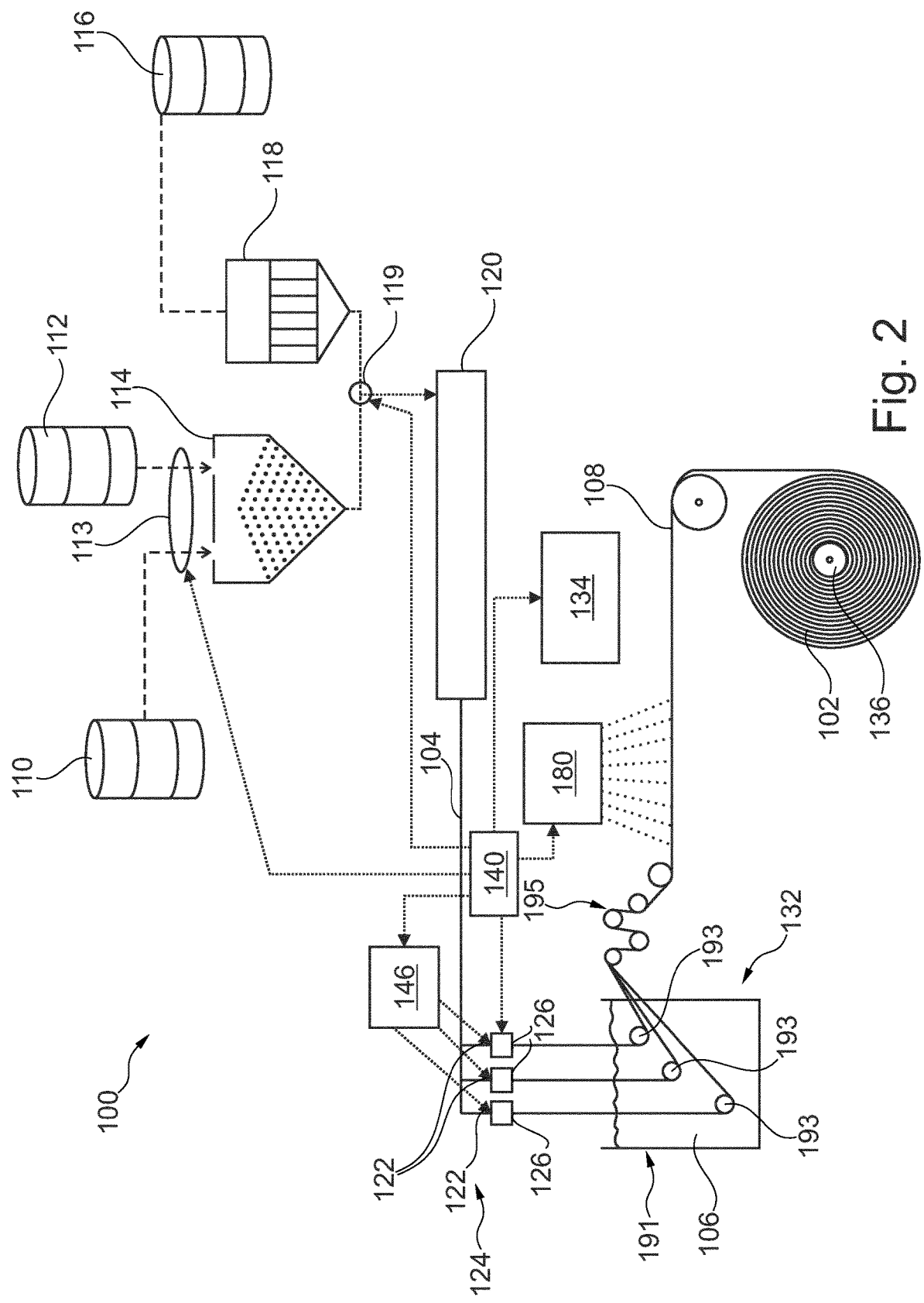
FIG. 2 shows a device for manufacturing a molded body which comprises cellulose by a lyocell-method on basis of a starting material manufactured by a lyocell-method, according to an exemplary embodiment of the invention.

By diluting the solved cellulose source 48, i.e. the lyocell-spinning solution, after passing the spinning nozzles, by a coagulation medium (in particular a spinning bath, such as the spinning bath which is illustrated in FIG. 2 with reference sign 191, or another spinning bath) which is preferably water-containing or even consists of water, coagulating, precipitating and depositing 56, respectively, of the cellulose from the lyocell-spinning solution may be triggered. In this way, cellulose may be manufactured, for example in form of fibers, in a solid phase (i.e. present as solid body).

As illustrated with block 58, the such obtained and extracted, respectively, cellulose may be made subject to an optional posttreatment, for example drying or changing the geometric form of appearance of the cellulose (for example by cutting to staple fibers).

In other words, as illustrated with the blocks 48, 52, 54, 56 and 58, the described method may accomplish a manufacture of the starting material 110 which comprises cellulose by solving 52 the cellulose source 48 in the solvent and subsequently precipitating 56 the cellulose by diluting the solved cellulose source 48. In other words, the starting material 110 may be manufactured by a lyocell-method illustrated with the blocks 48, 52, 54, 56 and 58.

The starting material 110 may be further processed, for example by manufacturing clothes on basis of the extracted cellulose. For example, the cellulose may be further processed to a textile tissue, in particular using further constituents (for example synthetic plastics such as polyester and elastane). From the textile tissue, parts can be cut, and also additional bodies which are not consisting of cellulose, such as buttons and seams, may be processed to an item of clothing (for example a T-shirt).

As illustrated with block 60, a such manufactured starting material 110 may be used by a consumer, for example as item of clothing.

When the consumer disposes the item of clothing, it may be used as post-consumer starting material 110 for a subsequent further lyocell-method which is described in more detail in the following. Alternatively or in addition, it is also possible to use a pre-consumer starting material 110 which comprises lyocell-cellulose for a subsequent further lyocell-method, for example offcut wastes from the clothing manufacture.

In the following, it is described how on basis of the starting material 110 which at least partially comprises lyocell-cellulose, molded bodies 102 made of lyocell-cellulose may be manufactured according to an embodiment of the invention. For this purpose, the starting material 110 is supplied to a device 100 (see FIG. 2) for performing a lyocell-method, compare reference sign 78.

There, at first a mechanical comminuting 62 of the starting material 110 by shredding may be performed. Thereby, mainly large non-cellulosic disturbing matters may be removed from the starting material 110, for example buttons, seams and prints of the old clothes which have been at least partially used for generating the starting material 110. By mechanically comminuting 62, the starting material 110 can be separated to single fibers, for example.

It is also possible (see block 64) to utilize the starting material 110 which comprises cellulose commonly with other materials which are comprising cellulose, for the subsequent lyocell-method. Thus, the starting material 110 can be mixed with a further starting material which comprises cellulose, see block 64. Alternatively or in addition, the starting material 110 may also comprise remains from a clothing manufacture, for example. Furthermore, it is optionally also possible to add another material which comprises cellulose to the starting material, for example wood pulp. It is also possible to mix the starting material 110 which is obtained according to the first and above described lyocell-method with a further non-lyocell starting material which comprises cellulose. The latter may comprise rags pulp of textiles, cotton of a cotton plant, cellulose recovered from a viscose-method and/or cotton linters (i.e. substantially shorter cotton strains with respect to cotton lint which have approximately 38 mm length, for example, as they grow at the seed of a cotton plant), for example. The portion of cellulose which is recovered by the lyocell-method of the starting material 110 may be for example between 3 weight percent and 100 weight percent, in particular between 10 weight percent and 80 weight percent. It is especially preferred when this portion is 100 weight percent (wherein it is known to a person skilled in the art, that a low foreign matter portion may always be present).

Directly after mechanically comminuting 62 and directly after mixing 64, respectively, directly solving 68 the (pure and mixed, respectively) starting material 110 in a further solvent 116 (for example tertiary amine oxides, such as N-methylmorpholine-N-oxide (NMMO)) can be performed without chemical pretreatment in an advantageous manner, wherein thereby a spinning mass is obtained. In more detail, the mechanically comminuted (and optionally mixed) starting material 110 may be directly transferred in solution, in particular without chemical cleaning and without adjusting the viscosity. In this way, the manufacturing method and recycling method, respectively, can be performed in an extraordinary simple and fast and ecological manner.

Alternatively, the method may comprise, after mechanically comminuting 62 (or after mixing 64) and prior to solving 68, optionally chemically cleaning 66 the starting material 110. Such an optional cleaning 66 may comprise at least partially removing colorants by bleaching, for example. Thereby it is possible to completely or partially discolor the starting material 110 prior to a subsequent solving 68 of the starting material 110 in the solvent 116, for example in order to manufacture white or gray molded bodies 102. Alternatively or in addition, it is also possible, as part of the optional chemical cleaning 66, that the starting material 110 (prior or after solving 68 it) is at least partially freed from cross-linkers which are cross-linking fibers of the starting material 110. In applications, wherein such cross-linkers are present between the fibers of the starting material 110, the starting material 110 may be completely or partially freed from these cross-linkers by an alkaline or and acid pretreatment, for example. This additionally improves the solubility of the starting material 110.

After solving 68 the starting material 110 in the solvent (preferably NMMO), the obtained lyocell-spinning solution and spinning mass, respectively, may be pressed through one or more spinning nozzles, whereby by extruding threads and filaments, respectively, with a honey-like viscosity are generated (see block 70 concerning this spinning).

During and/or after the falling of these threads and filaments, respectively, these are brought in operational connection with an aqueous environment and therefore diluted. Thereby, the concentration of the solvent 116 of the threads and filaments, respectively, is reduced in an aqueous liquid bath as spinning bath, for example, to such an extent that the lyocell-spinning solution is transferred to a solid phase made of cellulose-filaments. In other words, a precipitating, depositing or coagulating of the cellulose-filaments occurs, see reference sign 72. Thereby, the molded body 102 and a preform for a staple fiber, respectively, is obtained.

Solving 68, spinning 70, and subsequently precipitating 72 by a lyocell-method is thus performed based on a starting material 110 which itself comprises or consists of cellulose material which is manufactured by a previous lyocell-method. Descriptively, the described manufacturing method may thus be denoted as lyocell-with-lyocell-method. In other words, a starting material 110 which is manufactured by a first lyocell-method and which comprises cellulose, may be used for manufacturing a molded body 102 which comprises cellulose, by treating the starting material 110 by a second lyocell-method.

Furthermore, the method may comprise postprocessing 74 the precipitated lyocell-cellulose for influencing the properties of the molded body 102. Such a postprocessing may encompass drying, impregnating and/or reshaping the obtained filaments to the final molded body 102, for example. For example, the molded body 102 may be processed by the described manufacturing method to fibers, a foil, a tissue, a fleece, a sphere, a porous sponge, or beads and may then be supplied to a further use (compare reference sign 76).

With advantage, after using the molded body 102, its lyocell-cellulose may be recovered again by performing a further lyocell-method corresponding to the method steps between reference signs 78 and 74 (see block 80). This multiple repeatability of the lyocell-recycling by repeated lyocell-method stages is enabled by the knowledge that the degradation and DP-reduction of a lyocell-cellulose by multiple repetitions of lyocell-methods is surprisingly low.

FIG. 2 shows a device 100 for manufacturing a molding body 102 which comprises cellulose by means of a lyocell-method on basis of a starting material which is manufactured by a previous lyocell-method, according to an exemplary embodiment of the invention which is described with reference to FIG. 1.

Thus, FIG. 2 shows a device 100 according to an exemplary embodiment of the invention for manufacturing a cellulose-comprising molded body 102 which may be manufactured in form of a fleece (nonwoven), as fiber, foil, sphere, textile tissue, sponge, or in form of beads or flakes, for example. According to FIG. 2, the molded body 102 is manufactured directly from a spinning solution 104. The latter is converted to cellulose fibers 108 as molded body 102 by means of a coagulation-fluid 106 (in particular made of air humidity) and/or a coagulation-bath 191 (for example a water bath which optionally comprises tertiary amine oxides such as N-methylmorpholine-N-oxide (NMMO)). By means of the device 100, a lyocell-method may be performed. In this way, substantially endless filaments or fibers 108 or mixtures of substantially endless filaments and fibers 108 with a discrete length may be manufactured as molded body 102, for example. A plurality of nozzles which respectively have one or more openings 126 (which may be also denoted as spinning holes) are provided for ejecting the lyocell-spinning solution 104.

As can be taken from FIG. 2, a starting material 110 which is based on cellulose may be supplied to a storage tank 114 via a dosing device 113.

According to an embodiment, a water ingress in the cellulose-based starting material 110 may occur by a solvent 116 (in particular NMMO) which is described in more detail below. Furthermore, the cellulose-based starting material 110 itself may contain a certain residual moisture (dry pulp frequently has a residual moisture of 5 weight percent to 8 weight percent, for example). In particular, according to the described embodiment, the starting material 110 may be directly supplied to a mixture of water and solvent 116 without pre-moistening. An optional water container 112 which is shown in FIG. 2 may then be omitted.

According to an alternative embodiment, the starting material 110 which is comprising cellulose may be additionally moistened, in order to therefore provide moist cellulose. For this purpose, water from an optional water container 112 may be supplied to the storage tank 114 via the dosing device 113. Therefore, the dosing device 113 which is controlled by a control device 140 may supply adjustable relative amounts of water and starting material 110 to the storage tank 114.

A suitable solvent 116, preferably tertiary amine oxides such as N-methylmorpholine-N-oxide (NMMO) and an aqueous mixture of the solvent 116, respectively, for example a 76% solution of NMMO in water, is contained in a solvent container. The concentration of the solvent 116 may be adjusted in a concentrating device 118 either by supplying pure solvent or water. The solvent 116 may then be mixed with the starting material 110 with definable relative amounts in a mixing unit 119. Also the mixing unit 119 may be controlled by the control unit 140. Thereby, the cellulose-comprising starting material 110 is solved in the concentrated solvent 116 in a solving device 120 with adjustable relative amounts, whereby the lyocell-spinning solution 104 is obtained. The relative concentration ranges (also denoted as spinning window) of the components starting material 110, water and solvent 116 in the spinning solution 104 for manufacturing cellulosic regenerated molded bodies according to the lyocell-method may be suitably adjusted as known to a person skilled in the art.

The lyocell-spinning solution 104 is supplied to a fiber generating device 124 (which may be configured with a number of spinning beams or jets 122).

When the lyocell-spinning solution 104 is guided through the openings 126 of the jets 122, it is separated into a plurality of parallel threads made of the lyocell-spinning solution 104. The described process flow transforms the lyocell-spinning solution 104 to increasingly long and thin threads whose properties may be adjusted by a corresponding adjustment of the process conditions, controlled by the control unit 140. Optionally, a gas flow may accelerate the lyocell-spinning solution 104 on its way from the openings 126 to a fiber receiving unit 132.

After the lyocell-spinning solution 104 has moved through the jets 122 and further downwards, the long and thin threads of the lyocell-spinning solution 104 interact with the coagulation-fluid 106.

In the interaction with the coagulation-fluid 106 (for example water), the solvent concentration of the lyocell-spinning solution 104 is reduced, such that the cellulose of the starting material 110 at least partially coagulates and precipitates, respectively, as long and thin cellulose fibers 108 (which may still contain residues of solvent and water).

During or after the initial formation of the individual cellulose fibers 108 from the extruded lyocell-spinning solution 104, the cellulose fibers 108 are received at the fiber receiving unit 132. The cellulose fibers 108 may immerse into the coagulation-bath 191 shown in FIG. 2 (for example a water bath optionally comprising a solvent such as NMMO) and may complete their precipitation when interacting with a liquid of the coagulation-bath 191. Depending on the process adjustment of the coagulation, the cellulose may form cellulose fibers 108 (as shown, wherein the cellulose fibers 108 may be made of one substance and integrally merged with each other ("merging"), respectively, or may be present as separated cellulose fibers 108), or a foil and a film, respectively, made of cellulose may form at the fiber receiving unit 132 (not illustrated in FIG. 2).

Thus, the cellulose fibers 108 are extruded out of the spinning nozzles of the jets 122 and are guided through the spinning bath and coagulation-bath 191, respectively (for example containing water and NMMO in low concentration for precipitation/coagulation), wherein the cellulose fibers 108 are guided around a respective deflection roll 193 in the coagulation-bath 191 and are supplied to a draw-off godet 195 outside the coagulation-bath 191. The draw-off godet 195 serves for further transport and post-stretching of the cellulose fibers 108, in order to achieve a desired titer. Downstream the draw-off godet 195, the fiber bundle made of the cellulose fibers 108 is washed in a washing unit 180, optionally scrooped and subsequently cut (not shown).

Although not illustrated in FIG. 2, the solvent 116 of the lyocell-spinning solution 104 which is removed from the cellulose fibers 108 when coagulating and in a subsequent washing in the washing unit 180, may at least partially be recovered and recycled, respectively, and may be transferred back to the storage tank 114 in a subsequent cycle.

During the transport along the fiber receiving unit 132, the molded body 102 (here in form of the cellulose fibers 108) may be washed by means of the washing unit 180, as the latter supplies a washing liquid for removing solvent residues. Thereafter, the molded body 102 may be dried.

Moreover, the molded body 102 may be made subject to a posttreatment, see the schematically illustrated posttreatment unit 134. For example, such a posttreatment may comprise a hydro-entangling, a posttreatment, a needle treatment, an impregnation, a steam treatment with a steam which is supplied under pressure and/or a calendaring, etc.

The fiber receiving unit 132 may supply the molded body 102 to a winding device 136, at which the molded body 102 may be winded. The molded body 102 may then be supplied as rolling freight to an entity which manufactures products such as wipes or textiles on basis of the molded body 102.

In order to be able to perform a method according to an exemplary embodiment of the invention by the device 100 according to FIG. 2, as starting material 110, material is completely or partially supplied which was recovered from a preceding lyocell-method (also performable with a device 100 according to FIG. 2).

In the following, examples for a process flow according to exemplary embodiments of the invention are described:

Example 1

In an exemplary application of the method according to an embodiment of the invention, in a laboratory facility, cellulose fibers manufactured according to the lyocell-method were utilized as starting material for performing a further lyocell-method. Specifically, lyocell shortcut fibers with a fiber length of 3 mm were utilized. This starting material was mixed with an aqueous NMMO solution without further pretreatment, in order to manufacture a spinnable solution therefrom. This spinning solution was subsequently regenerated in form of filaments and cut to staple fibers with a titer of 1.3 dtex and a length of 38 mm. During the characterization of the such obtained fibers, it has turned out that the obtained properties (in particular fiber strength (FFk) and extension (FDk)) are substantially comparable with such lyocell-fibers which can be obtained in the same laboratory facility with typical chemical pulp as starting material (compare table 1).

Example 2

The lyocell shortcut fibers of example 1, without further pretreatment, were mixed with lyocell-suitable chemical pulp as further starting material. The total amount of the mixed starting materials in this example consisted of 20 weight percent of the lyocell shortcut fibers and 80 weight percent of the chemical pulp. From the mixed starting materials, in a subsequent lyocell-method with NMMO, a spinning solution was manufactured and staple fibers were manufactured therefrom. As in example 1, it was found that the properties of the such manufactured lyocell-fibers substantially are in accordance with those which can be manufactured in the same laboratory facility with chemical pulp as exclusive starting material (compare table 1).

TABLE 1 fiber properties

| Example | Portion lyocell starting material Weight percent | Portion chemical pulp Weight percent | Titer dtex | Strength cN/dtex | Extension % |
|---|---|---|---|---|---|
| Example 1 | 100 | 0 | 1.25 | 34.2 | 10.7 |
| Example 2 | 20 | 80 | 1.32 | 33.9 | 12.1 |
| Example 3 | 0 | 100 | 1.26 | 33.5 | 11.8 |

Figure 3:
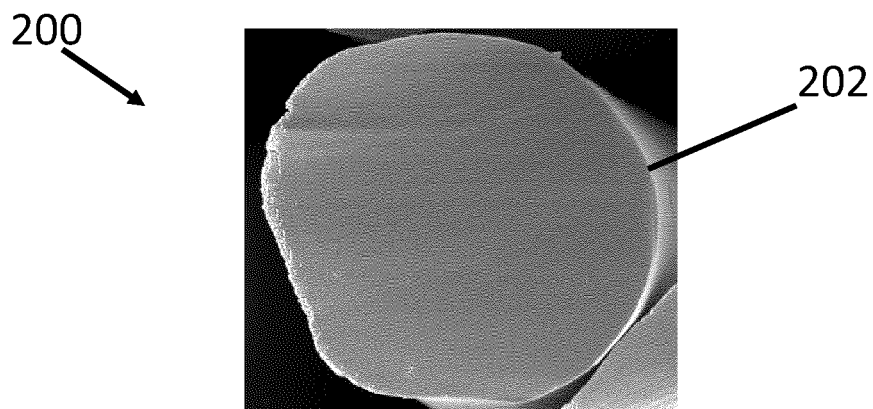
FIG. 3 shows a cellulose fiber which is manufactured by a lyocell-method.

FIG. 3 shows a cellulose fiber 200 which is manufactured by means of a lyocell-method in cross-section. The cellulose fiber 200 which is manufactured by means of a lyocell-method has a smooth round outer surface 202 and is homogenous and free from macroscopic holes, filled with cellulose material. Therefore, it can be unambiguously distinguished from cellulose fibers which are manufactured by means of a viscose-method (see reference sign 204 in FIG. 4) and from cellulose fibers of cotton plants (see reference sign 206 in FIG. 5) by a person skilled in the art.

Figure 4:
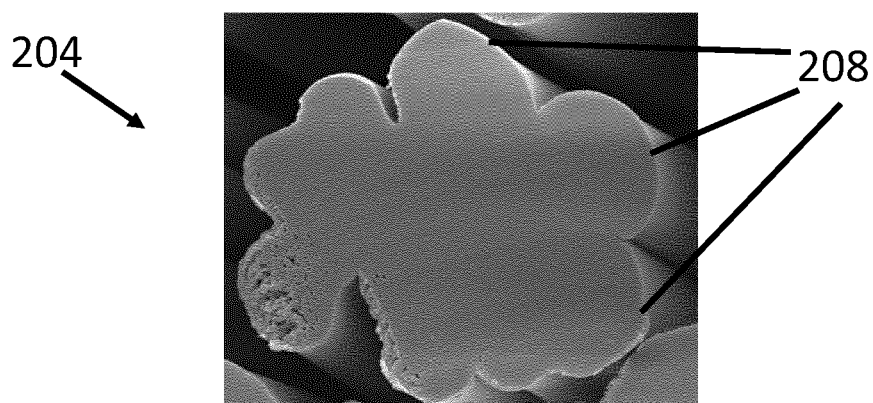
FIG. 4 shows a cellulose fiber which is manufactured by a viscose-method.

FIG. 4 shows a cellulose fiber 204 which is manufactured by means of a viscose-method in cross-section. The cellulose fiber 204 is cloud-shaped and comprises a plurality of arc-shaped structures 208 along its outer circumference.

Figure 5:
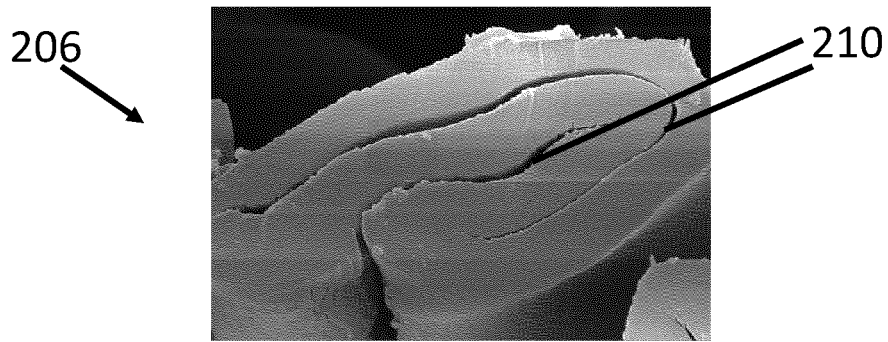
FIG. 5 shows a natural cellulose fiber of a cotton plant.

FIG. 5 shows a natural cellulose fiber 206 of a cotton plant in cross-section. The cellulose fiber 206 is kidney-shaped and comprises a lumen 210 which is free from material as a fully circumferentially enclosed hollow in an interior.

By means of the significant geometric and structural, respectively, differences of the fibers according to FIG. 3 to FIG. 5, it is possible for a person skilled in the art to unambiguously determine, for example by means of a microscope, if a cellulose fiber is formed by means of the lyocell-method, by means of the viscose-method, or naturally in a cotton plant.

In addition, it should be noted that "comprising" does not exclude other elements or steps and "a" or "an" does not exclude a multiplicity. Furthermore, it should be noted that features or steps which are described with reference to one of the above embodiments may also be used in combination with other features or steps of other above described embodiments. Reference signs in the claims shall not be construed as a limitation.

The invention claimed is:

1. Method of manufacturing a cellulose-regenerated-molded body, wherein the method comprises:
   supplying a starting material which is manufactured by a lyocell-method and which comprises cellulose, which is manufactured
      by solving a cellulose source in a solvent for manufacturing a spinning mass,
      by extruding the spinning mass, and
      by subsequently precipitating in a spinning bath;
   solving the starting material which comprises cellulose in a solvent for manufacturing a spinning mass, wherein solving the starting material is performed by a direct solving method; and
   extruding and subsequently precipitating the spinning mass in a spinning bath, wherein thereby the molded body is obtained.

2. Method according to claim 1, wherein the spinning bath for the solved starting material which comprises cellulose comprises water and solvent.

3. Method according to claim 1, wherein the spinning bath for the solved cellulose source comprises water and solvent.

4. Method according to claim 1, wherein the molded body is a filament, a fiber, a foil, a sponge or a sphere.

5. Method according to claim 1, wherein the method comprises performing a further lyocell-method which comprises:
   solving the molded body in a solvent for manufacturing a spinning mass; and
   extruding and subsequently precipitating the spinning mass in a spinning bath, wherein thereby another molded body is obtained.

6. Method according to claim 1, wherein the method comprises comminuting the starting material prior to solving the starting material in the solvent.

7. Method according to claim 1, wherein the method comprises solving the starting material in the solvent without chemical pretreatment of the starting material.

8. Method according to claim 1, wherein the method comprises at least partially cleaning the starting material prior to solving the starting material in the solvent.

9. Method according to claim 8, wherein the cleaning comprises at least partially removing colorants from the starting material prior to solving the starting material in the solvent.

10. Method according to claim 1, wherein the starting material, prior to precipitating it is at least partially freed from cross-linkers which are cross-linking fibers of the starting material.

11. Method according to claim 1, comprising at least one of the following features:
   wherein the starting material is completely or partially made of remains from a clothing manufacture and/or of old clothes;
   wherein the starting material, prior to precipitating it is mixed with another starting material which comprises cellulose, wherein the other starting material comprises at least one material of a group which is consisting of wood pulp, rags pulp, textiles, clothes, cotton, and cellulose manufactured by a viscose-method;
   wherein the method comprises postprocessing the precipitated molded body;
   wherein the solving of the starting material and/or the solving of the cellulose source is performed by a direct solving method and/or by tertiary amine oxides and/or by ionic liquids as solvent;
   wherein the solving of the starting material and the subsequent precipitating of the molded body is performed by a lyocell-method.

12. Method according to claim 1, wherein the method comprises manufacturing the starting material which comprises cellulose by means of:
   solving the cellulose source in the solvent for manufacturing the spinning mass; and
   extruding and subsequently precipitating the spinning mass in the spinning bath.

13. Method according to claim 1, wherein fibers of the starting material or the molded body comprise a smooth round outer surface.

14. Use of a starting material which is manufactured by a first lyocell-method and which comprises cellulose, for manufacturing a molded body which comprises cellulose, by treating the starting material by a second lyocell-method.

15. Use according to claim 14, wherein as at least a part of the starting material, textiles are used.

* * * * *